Patented June 23, 1936

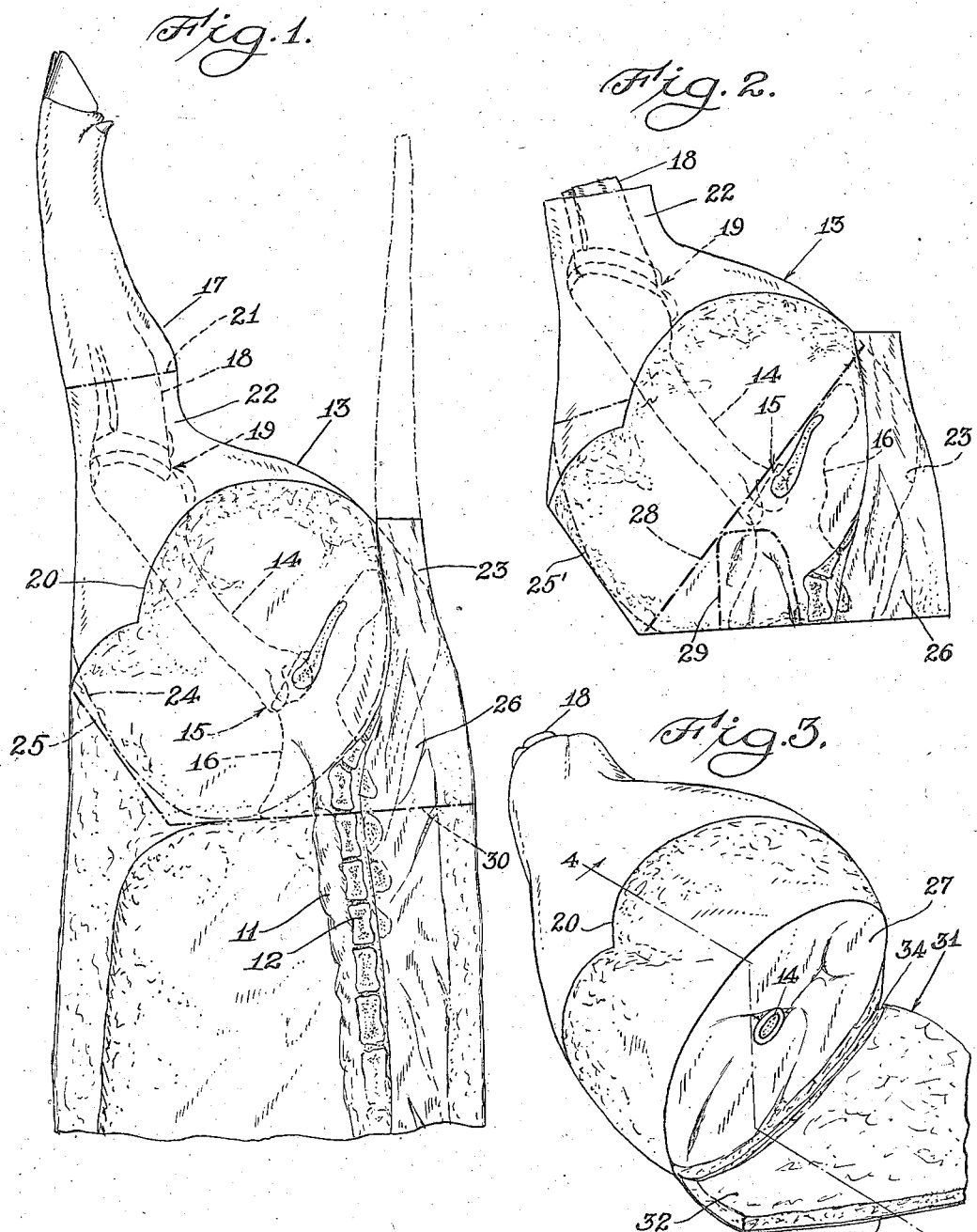

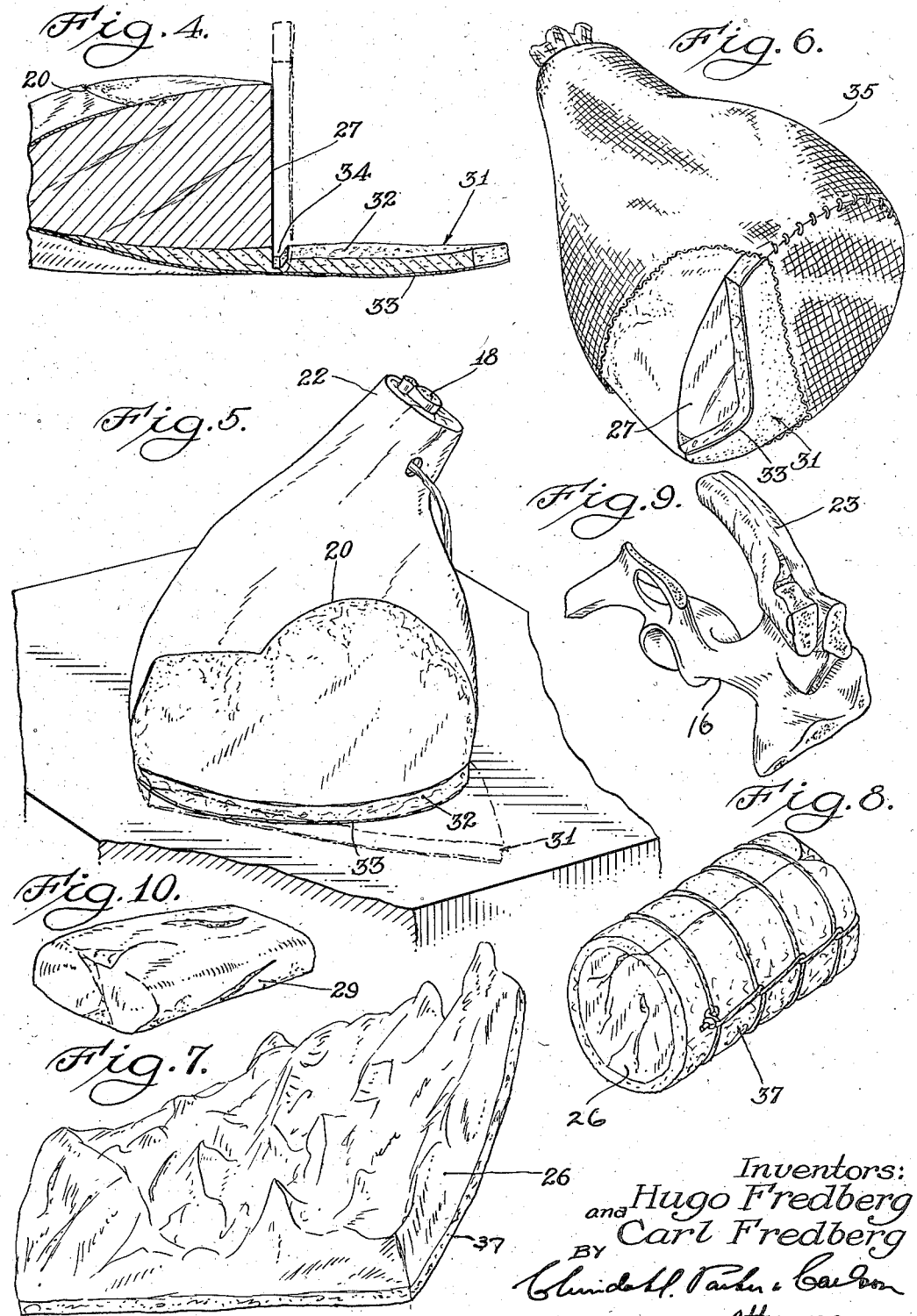

2,044,841

UNITED STATES PATENT OFFICE 2,044,841

ART OF MEAT PACKING

Hugo Fredberg and Carl Fredberg, Chicago, Ill.

Application January 12, 1934, Serial No. 706,395

4 Claims. (Cl. 99—157)

The invention pertains to the art of meat packing, and concerns more especially the preparation of smoked hams from hog carcasses; and the general aim of the invention is to minimize waste in the preparation of hams thereby rendering it possible to reduce the cost thereof to the ultimate consumer.

For many years, hams have been prepared so as to include a rounded butt end containing a large irregular hip bone. While the meat surrounding this hip bone is originally of excellent quality, after it has been subjected to the usual curing and smoking operations, it becomes much inferior, with the result that the retail butcher is called upon to cut it off for disposal as a separate cut commonly known as a ham butt.

The primary object of the present invention is to avoid the waste incident to the former method by forming the ham with a broad flat base disposed in a transverse plane substantially perpendicular to the thigh bone at the upper end thereof, and by covering such base with a heavy covering having the same protective function in the smoking process as the former rounded butt end but being capable of being supplied without appreciable cost.

Another difficulty commonly experienced in connection with the former method of preparing hams is that the presence of the large angular hip bone in the rounded butt end thereof interferes seriously with the proper curing of the meat. This is for the reason that the bone not only obstructs the entry of the pickling solution but its irregular surfaces provide pockets for the collection of the liquid preventing the proper draining thereof, with the result that the meat becomes soggy, the bone discolored, and very frequently, the entire ham spoiled. It is accordingly another object of our invention to provide a ham of such character as to facilitate the curing operation and permit free drainage of the pickling solution from around the bone and thus insure a uniformly high quality product.

A further object is to utilize to advantage that portion of the ham formerly constituting the rounded butt end by combining it with the adjoining butt end of the pork loin, removing therefrom the bony structure, shaping the meat to form a boneless portion, and providing a heavy covering therefor to protect it while being smoked.

The objects of the invention thus generally stated together with other attendant advantages are attained by the mode of operation hereinafter set forth in connection with the accompanying drawings wherein:

Figure 1 is a side elevational view of the rear portion of a longitudinal half of a hog carcass.

Fig. 2 is a side elevational view of a portion cut from the half carcass and including both the ham and the butt section.

Fig. 3 is a perspective view of the ham after severance from the butt section.

Fig. 4 is a fragmentary longitudinal sectional view illustrating a preferred manner of forming a protective covering for the ham.

Fig. 5 is a perspective view of the ham resting on its broad base upon a table or the like during the curing operation.

Fig. 6 is a fragmentary perspective view of the ham prepared for the smoking operation and showing a part of the protective covering broken away.

Figs. 7 and 8 are perspective views of the deboned butt section before and after rolling to form a boneless ham.

Fig. 9 is a fragmentary perspective view of the hip bone and a portion of the tail bone.

Fig. 10 is a perspective view of a part of the tenderloin removed from the butt section.

In carrying out our invention, the hog carcass is divided longitudinally along an approximate center loin to form two similar halves, the rear portion of one of which is shown in Fig. 1. This half of the carcass includes the loin 11 containing the spine 12, and the ham 13 containing the thigh bone 14 connected at its upper end by a ball and socket joint 15 with the thigh bone 16. 17 designates the leg containing the shin bone 18 connected by a joint 19 with the lower end of the thigh bone 14. In dividing the two halves of the carcass, the ham is cut in a direction longitudinally thereof as indicated at 20.

According to the practice long in use by meat packers, the leg 17 is severed transversely as indicated at 21 at a point slightly below the joint 19, so as to form a shank 22. The opposite or large end of the ham is then formed by a rounded cut just above the hip bone 16 and beneath the tail bone 23 which is joined to the hip bone. This cut passes through the joint between the hip bone and the end of the spine as indicated by the broken curved line 24, and the fat from the underside of the ham is trimmed substantially along the line 25. Thus it will be apparent that according to the former method, the ham is shaped to form a rounded butt end containing the hip bone, and the pork loin also has a butt end 26 containing the end vertebræ of the spine.

As first above set forth, such prior method of forming the ham results in a substantial loss or waste. This occurs from the fact that when the ham is cured it is necessary to inject the curing or pickling fluid under pressure into and around the bony structure at the large end of the ham as well as at the small end thereof. Because of the presence of the hip bone 16 in the large end of the ham, difficulty is encountered in properly injecting the pickling solution and frequently an excess of such fluid is introduced. In any event free drainage of the solution is prevented, with the result that the meat is apt to become soggy imparting a strong bitter taste thereto. Also, the bone has a tendency to become discolored, and presents when exposed, an appearance such as to render this portion of the meat unsaleable. Furthermore, failure to properly cure the meat surrounding the bone frequently results in the spoilage of the entire ham, thus entailing a considerable loss.

But aside from the difficulties incurred in properly curing the ham the former rounded butt end thereof is exposed directly to the heat applied in the smoking operation, with the result that this portion of the ham becomes dry and more or less charred. Accordingly, the retail butcher finds it necessary to cut off the butt end for sale as a separate cut, but at a much reduced price; and not infrequently, such butt ends accumulate so rapidly as to necessitate disposition as waste.

In accordance with our invention, the difficulties and objections above set forth are eliminated to the end that the selling price of the meat to the consumer need not include therein an allowance for a substantial loss or waste. In attaining this result, the ham is formed to provide a broad flat face or base 27 (Fig. 3) disposed substantially perpendicular to the hip bone 14 at the upper end thereof and formed by a transverse cut as indicated by the broken line 28 (Fig. 2) disposed immediately below the hip bone 16 and passing preferably through the extreme upper end of the thigh bone 14. At the opposite or underside of the ham the line of cut passes just under the end of the rear portion 29 of the pork tenderloin, the underside being trimmed of fat as indicated at 25'. The ham thus formed includes only the thigh bone 14, with the exception of the extreme upper end thereof, and the upper end portion of the shin bone 18.

The meat surrounding the hip bone is initially of excellent quality, and in further carrying out our invention, we utilize such meat to advantage by combining it with the rear portion of the loin. Thus the carcass is cut transversely approximately along the broken line 30 (Fig. 1) passing through the rear end of the spine. From the combined butt section thus formed, the rear end of the tenderloin 29 is removed, together with the hip bone 16 with its adjoining tail portion 23, thereby rendering it possible to conserve the meat of this section to good advantage as hereinafter more fully set forth.

It will be observed that in case of hams prepared in accordance with the prior method, the rounded butt end is depended upon to serve a useful function in the smoking process to protect the central major portion from the heat applied in such smoking operation, it having been the practice to sacrifice this butt portion for this purpose, apparently because of the inclusion therein of a substantial amount of bone. It is of the essence of our invention to avoid such sacrifice of the former butt end, but to permit the advantageous use thereof by substituting therefor a protective covering for the exposed face 27. To this end, we utilize a portion of the carcass otherwise of very small value, namely, a part of the back fat, to form a thick protective covering 31 composed of a relatively heavy layer of fat 32, having an outer skin covering 33.

Preferably this covering 32 is formed as an integral part of the back side of the ham so as to constitute a flap as indicated in Fig. 3. The flap is, of course, suitably shaped to cover the flat face 27, and to enable it to be folded tightly against this face, a groove 34 is cut in the fat adjacent the face as shown clearly in Fig. 4.

The protective covering 31 thus provided not only is inexpensive, but is further advantageous as compared to the butt end of the ham because it permits of the free drainage of the curing solution introduced around the thigh bone 14. Thus, in the curing operation, the ham may be placed in an upright position on a table or other support—rather than in a horizontal position, as heretofore—so as to rest upon its broad flat face 27, in which position the curing fluid may drain without undue restriction. Thus it is impossible to inject too much of the solution, and the curing period may accordingly be reduced. Furthermore, the heavy layer 32 of fat constituting the covering 31 assures a sufficient supply of moisture during the application of the heat to the ham in the smoking process, thus avoiding an undue drying of the meat.

In addition to insuring effectual drainage of the curing solution, it will also be apparent that the removal of the hip bone and consequent exposure of the upper end portion of the thigh bone, greatly facilitates the injection of the curing medium around the thigh bone. Thus the proper curing of the ham is insured.

After the curing operation the ham is prepared for the smoking process by placing the same in a woven bag or stocking 35 of a suitable shape to retain the protective covering 31 in position over the flat surface 27 of the ham. In this operation too, the absence of the bony structure from the large end of the ham is advantageous for the reason that the penetration of the ham by the smoke is greatly facilitated. After the ham has been smoked the covering 31 continues to perform a protective function until finally removed by the retail butcher.

If desired, the butt section may be formed into a boneless ham roll and smoked. In preparing this portion for the smoking operation, the bony structure consisting of the hip bone 16, the tail bone 23, and the rear end of the spine (Fig. 9) is extracted, and the rear end portion 29 of the tenderloin also removed, the latter for sale as a separate choice cut (Fig. 10).

Fig. 7 illustrates the butt section with the bony structure and tenderloin removed and with a heavy layer 37 of fat for the purpose of protecting the meat during the smoking process. In providing such protective covering, the back fat of the carcass is of sufficient thickness to permit of a longitudinal division thereof so as to form both the layer 32 of the fat 31 (Fig. 3) and the layer 37. Accordingly, we prefer to terminate the transverse cut 28 short of the rear side of the ham and then cut the flap 31 parallel with the skin 33 so as to leave a layer of fat approximately 1" thick on the skin. The remainder of the back fat is left adhering to the meat of the butt section 26. Obviously, however, other portions of the carcass may be availed of to provide coverings of adequate thickness.

It will be seen that by our improved mode of operation, waste is reduced to the bony structure consisting of the hip bone 16, tail piece 23, and the rear end of the spine. At the same time, it is possible to provide hams of uniformly high quality but with no attendant loss on account of improper curing of the meat; and a substantial advantage is gained from the effective utilization of a substantial portion of good quality meat formerly sacrificed to form a butt end for the ham to protect it during the smoking process. By such utilization of the meat to good advantage, the loss formerly charged to the center cut portions is eliminated, with the result that the price of the meat to the ultimate consumer may be reduced.

We claim as our invention:

1. In the art of meat packing, the method of preparing hams which comprises forming the ham with a broad flat base disposed in a plane passing through the extreme upper end of the thigh bone substantially perpendicular thereto so as to exclude the hip bone, curing the ham thus formed, and smoking the ham with a protective covering of substantial thickness overlying said base so as to prevent undue drying of the meat.

2. In the art of meat packing, the method of preparing hams which comprises forming the ham with a broad flat base disposed in a plane substantially perpendicular to the axis of the thigh bone at the upper end thereof so as to exclude the hip bone, curing the ham thus formed, securing a fatty covering of substantial thickness over said flat base, and smoking the ham suspended from its shank end with said covering exposed directly to the applied heat.

3. In the art of meat packing, the method of preparing hams which comprises forming the ham with a broad flat base disposed in a transverse plane passing through the upper end of the thigh bone, subjecting the ham thus formed to a curing operation including the introduction of a curing solution around the thigh bone, and placing the ham in upright position on said base to drain such solution; covering said base of the ham with a heavy protective covering including a layer of fat of substantial thickness; and finally smoking the ham while suspended from its shank and with said protective covering exposed directly to heat applied from below the ham.

4. In the art of meat packing, the method of preparing hams for curing and smoking, which comprises severing the half carcass of a hog transversely at longitudinally spaced points to form a section consisting of a lower or ham portion containing the thigh bone, and an upper or butt portion containing the hip bone; cutting said section transversely in a plane immediately below the position normally occupied by the hip bone in the butt portion and disposed substantially perpendicular to the axis of the thigh bone at the upper end of the latter, thereby forming a separate ham portion having a broad flat base with said end of the thigh bone exposed; and covering said base with a protective covering of substantial thickness to prevent undue drying of the meat by the application of heat to the base during the smoking process.

HUGO FREDBERG.
CARL FREDBERG.